United States Patent
Masuda (10) Patent No.: US 10,725,363 B2
(45) Date of Patent: Jul. 28, 2020

(54) LIGHT SOURCE UNIT AND PROJECTOR

(71) Applicant: CASIO COMPUTER CO., LTD., Tokyo (JP)

(72) Inventor: Hiroki Masuda, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/413,685

(22) Filed: May 16, 2019

(65) Prior Publication Data

US 2019/0361330 A1 Nov. 28, 2019

(30) Foreign Application Priority Data

May 24, 2018 (JP) .................. 2018-099648

(51) Int. Cl.
*G03B 21/16* (2006.01)
*H04N 9/31* (2006.01)
*G03B 21/20* (2006.01)
*G03B 21/00* (2006.01)

(52) U.S. Cl.
CPC ........... *G03B 21/16* (2013.01); *G03B 21/204* (2013.01); *H04N 9/3144* (2013.01); *G03B 21/008* (2013.01)

(58) Field of Classification Search
CPC ..... G03B 21/16; G03B 21/204; H04N 9/3144
See application file for complete search history.

(56) References Cited

U.S. PATENT DOCUMENTS

| | | | | |
|---|---|---|---|---|
| 10,057,552 B2* | 8/2018 | Okuno | ................... | G03B 21/16 |
| 10,114,276 B2* | 10/2018 | Kobayashi | .............. | F21V 14/08 |
| 10,168,605 B2* | 1/2019 | Egawa | ................ | G02B 26/008 |
| 2017/0293211 A1* | 10/2017 | Kobayashi | .............. | F21V 14/08 |
| 2017/0302895 A1* | 10/2017 | Okuno | ................ | F28D 15/0275 |
| 2018/0031957 A1* | 2/2018 | Egawa | ................ | G02B 26/008 |
| 2019/0049075 A1* | 2/2019 | Ishige | ....................... | F21V 9/32 |
| 2019/0277486 A1* | 9/2019 | Nakao | ..................... | F21V 29/76 |

FOREIGN PATENT DOCUMENTS

| | | |
|---|---|---|
| JP | 2005-260102 A | 9/2005 |
| JP | 2010-274256 A | 12/2010 |
| JP | 2012-059452 A | 3/2012 |
| JP | 2013-187043 A | 9/2013 |
| WO | WO 2017/068765 A1 | 4/2017 |

\* cited by examiner

*Primary Examiner* — Bao-Luan Q Le
(74) *Attorney, Agent, or Firm* — Scully Scott Murphy & Presser (57) ABSTRACT

A light source unit of the present invention includes a luminescent material plate, a joining plate on one side of which the luminescent material plate is disposed, a heat dissipating member disposed on the other side of the joining plate, and a heat conductive layer configured to thermally connect the joining plate and the heat dissipating member together and disposed between the joining plate and the heat dissipating member, and a heat conductivity of an area of the heat conductive layer which corresponds to the luminescent material plate is lower than a heat conductivity of a periphery of the area of the heat conductive layer which corresponds to the luminescent material plate.

20 Claims, 5 Drawing Sheets

LIGHT SOURCE UNIT AND PROJECTOR

CROSS-REFERENCE TO RELATED APPLICATION

This patent application is based upon and claims the benefit of priority under 35 USC 119 from Japanese Patent Application No. 2018-099648 filed on May 24, 2018, the entire disclosure of which, including the description, claims, drawings, and abstract, is incorporated herein by reference.

BACKGROUND OF THE INVENTION

Field of the Invention

The present invention relates to a light source unit and a projector including the light source unit.

Description of the Related Art

Data projectors are widely used on many occasions in these days as an image projector for projecting a screen of a personal computer, a video image, and further, an image based on image data recorded on a memory card or the like onto a screen. Conventionally, in the main stream of data projectors, high-intensity discharge lamps have been used. In recent years, however, projectors are proposed which include a light source unit employing a laser diode that is a semiconductor light emitting element that consumes less electric power, has an extended service life, and are highly bright.

A light source unit disclosed by Japanese Unexamined Patent Application No. 2013-187043 includes a luminescent material layer made up of ceramic of a luminescent material, that is, luminescent ceramic and a transparent layer provided an emerging side of the luminescent material layer from which light emerges, and a heat dissipating substrate is disposed on a side of the luminescent material layer which is situated opposite to the emerging side from which light emerges via a joining portion. The transparent layer is formed of, for example, transparent ceramic or transparent resin and has a higher heat conductivity than that of air. This transparent layer can effectively dissipate heat generated at an illuminated spot illuminated by excitation light shone from a solid light source in the luminescent material layer.

The transparent layer can increase a heat dissipating amount on the emerging side of the luminescent material layer (the luminescent material plate) that is made up of the luminescent ceramic or the like. However, even though thermal stress in the luminescent material plate is suppressed by increasing the heat dissipating amount on the emerging side of the luminescent material plate, in the event that a temperature difference between a front side and a rear side of the joining plate to which the luminescent material plate is joined is great, a warp is generated in the joining plate due to thermal expansion. Then, a drawback such as a crack or separation of the luminescent material plate may be generated from time to time.

SUMMARY OF THE INVENTION

The present invention has been made in view of the situations described above, and an object of the present invention is to provide a light source that can reduce the risk of cracking or separation of a luminescent material plate and a projector including this light source unit.

According to an aspect of the present invention, there is provided a light source unit including a luminescent material plate, a joining plate on one side of which the luminescent material plate is disposed, a heat dissipating member disposed on the other side of the joining plate, and a heat conductive layer configured to connect thermally the joining plate and the heat dissipating member and disposed between the joining plate and the heat dissipating member, wherein a heat conductivity of an area of the heat conductive layer which corresponds to the luminescent material plate is lower than a heat conductivity of a periphery of the heat conductive layer which corresponds to the luminescent material plate.

According to another aspect of the present invention, there is provided a projector including the light source unit described above, a display device on to which light source light is shone from the light source unit to form image light, a projection-side optical system configured to project the image light emitted from the display device on to a screen, and a projector control unit configured to control the display device and the light source unit.

DETAILED DESCRIPTION OF THE PREFERRED EMBODIMENT

Figure 1:
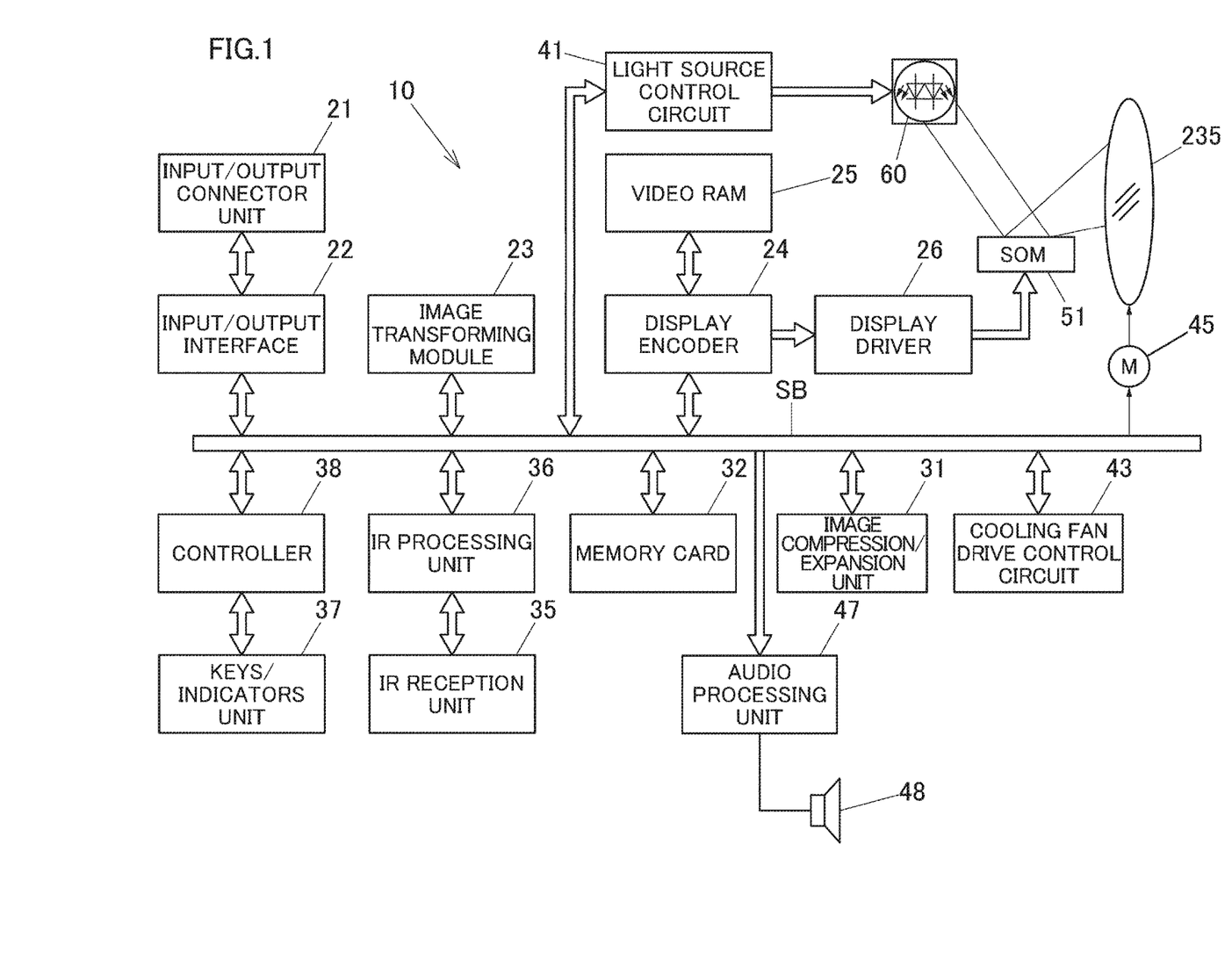
FIG. 1 is a block diagram illustrating functional blocks of a projector according to an embodiment of the present invention.

Hereinafter, an embodiment according to the present invention will be described based on drawings. FIG. 1 is a block diagram illustrating functional circuit blocks of a projector control unit of a projector 10. The projector control unit includes a controller 38, an input/output interface 22, an image transforming module 23, a display encoder 24, a display driver 26 and the like.

This controller 38 governs the control of operations of individual circuitries inside the projector 10 and includes CPU, ROM storing fixedly operation programs of various settings, RAM that is used as a work memory, and the like.

Then, the controller 38 sends image signals of various standards which are inputted from an input/output connector unit 21 via the input/output interface 22 and a system bus (SB) to the image transforming module 23, where the image signals are transformed so as to be unified into an image signal of a predetermined format which is suitable for display. Thereafter, the controller 38 outputs the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 functions a display device controller and drives a display device 51, which is a spatial optical modulator (SOM), at an appropriate frame rate corresponding to the image signal outputted from the display encoder 24.

Then, in the projector 10, pencils of light emitted from a light source unit 60 are shone onto the display device 51 by way of an optical system to form an optical image by reflecting light from the display device 51, and the image so formed is then projected onto a screen, not illustrated, for display by way of a projection-side optical system. A movable lens group 235 of the projection-side optical system is driven by a lens motor 45 for zooming and focusing.

An image compression/expansion unit 31 performs a recording process in which a luminance signal and a color difference signal of an image signal are data compressed through Adaptive Discrete Cosine Transform (ADCT) and Huffman coding processes, and the compressed data is sequentially written on a memory card 32 which constitutes a detachable recording medium.

Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

Then, operation signals from a keys/indicators unit 37 including main keys and indicators which are provided on a casing of the projector 10 are sent out directly to the controller 38. Key operation signals from a remote controller are received by an IR reception unit 35 and are then demodulated into a code signal at an IR processing unit 36 for output to the controller 38.

An audio processing unit 47 is connected to the controller 38 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which is configured as a light source control unit. The light source control circuit 41 controls individually a red light source device, a green light source device, and a blue light source device of the light source unit 60 so that light in predetermined wavelength ranges is emitted from the light source unit 60 so as to generate an image as required.

Further, the controller 38 causes a cooling fan drive control circuit 43 to detect temperatures through a plurality of temperature sensors which are provided in the light source unit 60 so as to control the revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
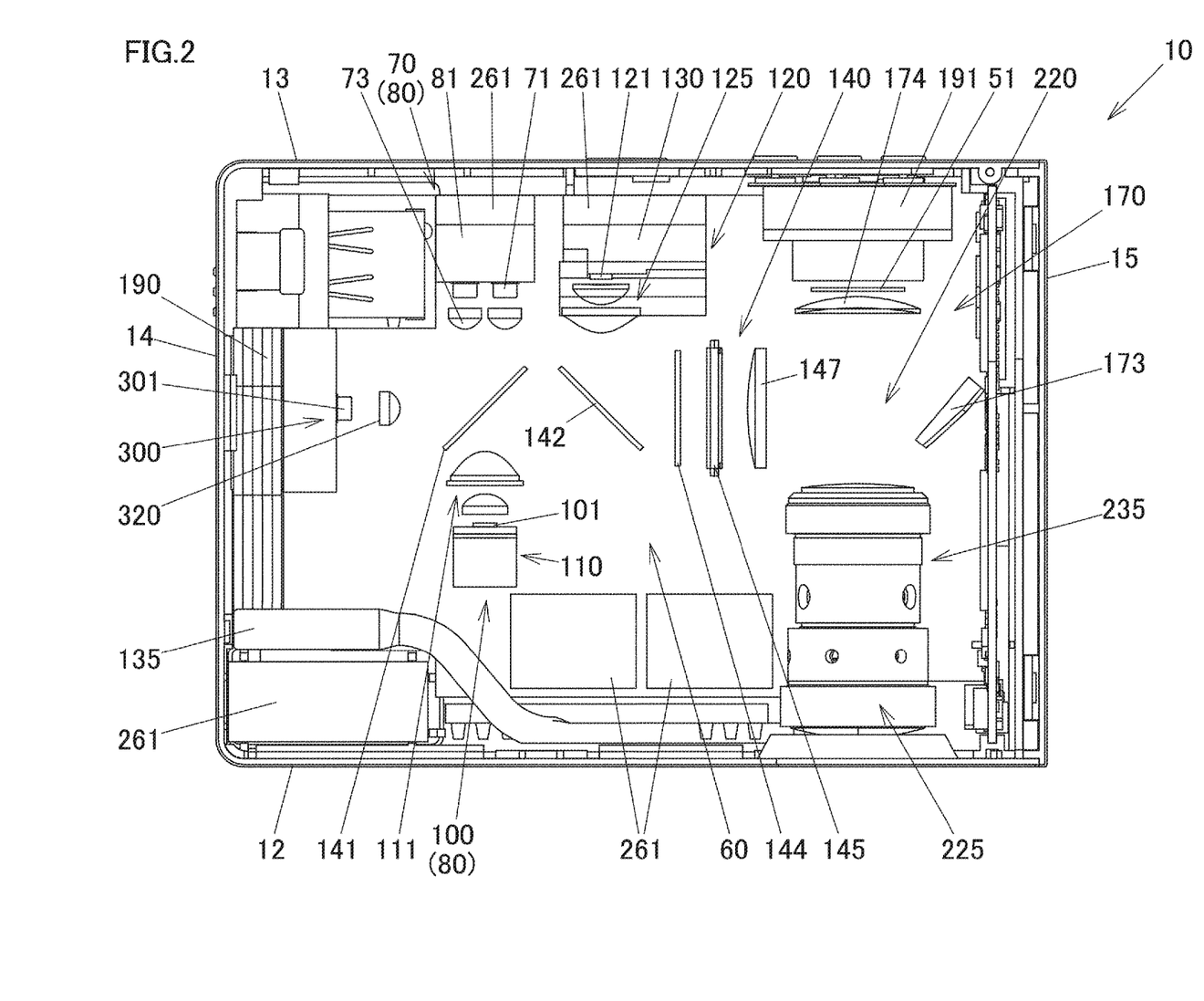
FIG. 2 is a schematic plan view illustrating an internal structure of the projector according to the embodiment of the present invention.

Next, an internal structure of the projector 10 will be described. FIG. 2 is a schematic plan view illustrating the internal structure of the projector 10. Here, the casing of the projector 10 has a substantially box-like shape and includes an upper and lower panels, a front panel 12, a rear panel 13, a right panel 14, and a left panel 15. In the following description, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 includes the light source unit 60 at a central portion, and a lens barrel 225 of a projection-side optical system 220 is provided to the left of the light source unit 60. The projector 10 includes the display device 51, which is a Digital Micromirror Device (DMD), between the lens barrel 225 and the rear panel 13. The projector 10 includes a heat sink 191 configured to cool the display device between the display device 51 and the rear panel 13. Further, the projector 10 includes a main control circuit board, not shown, below the light source unit 60.

The light source unit 60 is made up of a green light source device 80 configured to emit light having a wavelength in the green wavelength range or simply light in the green wavelength range, a red light source device 120 configured to emit light having a wavelength in the red wavelength range or simply light in the red wavelength range, a blue light source device 300 configured to emit light having a wavelength in the blue wavelength range or simply light in the blue wavelength range, and a light guiding optical system 140. The green light source device 80 is made up of an excitation light shining device 70 and a luminescent plate device 100.

The excitation light shining device 70 is disposed substantially central in a left-right direction of the projector 10 and near the rear panel 13. The excitation light shining device 70 is made up of two blue laser diodes 71, which are semiconductor light emitting elements. The two blue laser diodes 71 are disposed side by side in the left-right direction in such a manner that optical axes thereof are at right angles to the rear panel 13. Then, a heat sink 81 is disposed between the laser diodes 71 and the rear panel 13. Collimator lenses 73 are disposed individually on the optical axes of the blue laser diodes 71, and these collimator lenses 73 convert light emitted from the corresponding blue laser diodes 71 into parallel light so as to enhance the directivity of light emitted from the blue laser diodes 71. A cooling fan 261 is disposed between the heat sink 81 and the rear panel 13. The blue laser diodes 71 are cooled by the cooling fan 261 and the heat sink 81.

The luminescent plate device 100 emits light in the green wavelength range as a result of excitation light being shone on thereto from the excitation light shining device 70. The luminescent plate device 100 is disposed on an optical path of excitation light emitted from the excitation light shining device 70 and near the front panel 12. The luminescent plate device 100 includes a luminescent material plate member 110 and a collective lens group 111. The luminescent material plate section 101 includes a luminescent material plate 101, and this luminescent material plate 101 is disposed so as to be parallel to the front panel 12, that is, so as to be at right angles at an axis of light emitted from the excitation light shining device 70. The collective lens group 111 collects a pencil of excitation light emitted from the excitation light shining device 70 on to the luminescent material plate 101 and collects a pencil of luminescent light in the green wavelength range which is emitted from the luminescent material plate member 110 in the direction of the rear panel 13. The luminescent material plate member 110 of the luminescent plate device 100 will be described in detail later. A cooling fan 261 is disposed between the luminescent material plate member 110 and the front panel 12. The luminescent plate device 100 and the like are cooled by this cooling fan 261.

The red light source device 120 includes a red light source 121 and a collective lens group 125 configured to collects light emitted from the red light source 121. The red light source 121 is a red light emitting diode which is a semiconductor light emitting element emitting light in the red wavelength range. Then, the red light source device 120 is disposed in such a manner that an axis of light in the red wavelength range which is emitted from the red light source 121 of the red light source device 120 intersects an axis of light in the blue wavelength range which is emitted from the blue light source device 300 and an axis of light in the green wavelength range which is emitted from the luminescent material plate 101 and is reflected by a first dichroic mirror 141, which will be described later. Further, the red light source device 120 includes a heat sink 130 that is disposed at a side the red light source 121 which faces the rear panel 13. A cooling fan 261 is disposed between the heat sink 130 and the rear panel 13, and the red light source device 121 is cooled by the cooling fan 261 and the heat sink 130.

The blue light source device 300 is disposed substantially central in a front-rear direction of the projector 10 and near the right panel 14. The blue light source device 300 includes a blue laser diode 301 which is a semiconductor light emitting element and a collimator lens 320, and this collimator lens 320 converts light emitted from the blue laser diode 301 into parallel light so as to enhance the directivity of light emitted from the blue laser diode 301. Light emitted from the blue laser diode 301 by way of the collimator lens 320 is directed towards the left panel 15 in such a manner that an axis of the light so emitted becomes parallel to the front panel 12. Consequently, light emitted from the blue light source device 300 intersects light emitted from the excitation light shining device 70, light emitted from the luminescent plate device 100 and light emitted from the red light source device 120 at right angles. Then, a heat sink 190 is disposed at a side of the blue light source device 300 which faces the right panel 14.

A heat sink 135 is disposed between cooling fans 261 disposed on a side of the luminescent plate device 100 which faces the front panel 12 and the front panel 12, and this heat sink 135 extends from a position on a side of the cooling fan 261 which faces the front panel 12 to a side of the heat sink 190 which faces the front panel 12. Then, a cooling fan 261 is disposed between a portion of the heat sink 135 which lies near the right panel 14 and the front panel 12. The heat sinks 135, 190 are cooled by this cooling fan 261.

Then, the light guiding optical system 140 includes collective lenses configured to collect pencils of light in the red, green and blue wavelength ranges, and reflecting mirrors configured to change the axis of light in each of the red, green and blue wavelength ranges so that the axes of red light, green light and blue light are aligned. Specifically, the first dichroic mirror 141 is disposed in a position where the axis of light in the blue wavelength range which is emitted from the blue light source device 300 intersects the axes of light in the blue wavelength range which is emitted from the excitation light shining device 70 and light in the green wavelength range which is emitted from the luminescent plate device 100 at right angles. This dichroic mirror 141 transmits light in the blue wavelength range and reflects light in the green wavelength range and changes the axis of this green light through 90 degrees in the direction of the left panel 15. The first dichroic mirror 141 aligns the axis of light in the blue wavelength range which is emitted from the blue light source device 300 with the axis of light in the green wavelength range which is emitted from the luminescent plate device 100 so that the axes of the green light and the blue right are directed in the same direction.

Then, a second dichroic mirror 142 is disposed in a position where the axis of light in the blue wavelength range which is emitted from the blue light source device 300 and is transmitted through the first dichroic mirror 141 and the axis of light in the green wavelength which is emitted from the luminescent plate device 100 and is reflected by the first dichroic mirror 141 intersects the axis of light in the red wavelength range which is emitted from the red light source device 120 at right angles. This second dichroic mirror 142 transmits light in the blue wavelength range and light in the green wavelength range and reflects light in the red wavelength range to change the axis of the red light through 90 degrees in the direction of the left panel 15. The second dichroic mirror 142 aligns the axis of light in the blue wavelength range which is emitted from the blue light source device 300, the axis of light in the green wavelength range which is emitted from the luminescent plate device 100 and the axis of light in the red wavelength range which is emitted from the red light source device 120 with one another so that the axes of the green light, the blue right and the red light are directed in the same direction.

A diffuser plate 144 is disposed on a side of the second dichroic mirror 142 which faces the left panel 15. The diffuser plate 144 diffuses light in each of the blue, green and red wavelength ranges. Then, a microlens array 145 is disposed on a side of the diffuser plate 144 which faces the left panel 15. The microlens array 145 not only diffuses further light in each of the blue, green and red wavelength ranges but also superposes light which passes through the microlens array 145 on one another to uniformly distribute the intensity of light in each of the blue, green and red wavelength ranges.

In the microlens array of this embodiment, biconvex lenses each having a horizontally elongated rectangular shape when viewed from above are arranged into a lattice configuration. Then, a collective lens 147 is disposed on a side of the microlens array 145 which faces the left panel 15. The collective lens 147 collects diffuse light of the uniform intensity which passes through the microlens array 145 down to an effective size of the display device 51. In this way, the light guiding optical system 140 is made up of the first dichroic mirror 141, the second dichroic mirror 142, the diffuser plate 144, the microlens array 145, and the collective lens 147.

A light source-side optical system 170 is disposed on a side of the rear panel 13 and near the left panel 15 and includes a light axis changing mirror 173 and a condenser lens 174. The condenser lens 174 collects light emitted from the display device 51 and causes the light to be incident on the lens barrel 225, and due to this, the condenser lens 174 is considered to constitute one constituent element of the projection-side optical system 220.

Light emitted from the light source unit 60 is shone on to the light axis changing mirror 173. On the other hand, the condenser lens 174 is provided in front of the display device 51. Thus, light source light reflected by the light axis changing mirror 173 is shone on to the display device 51 effectively by the condenser lens 174.

On light which is reflected on the display device 51 is emitted towards a screen as projection light by the projection-side optical system 220. The lens barrel 225 of the projection-side optical system 220 includes a fixed lens group and the movable lens group 235, which are incorporated in the lens barrel 225, and thus, the lens barrel 225 is configured as a variable-focus lens. The movable lens group 235 is moved by the lens motor, which is a drive source, for zooming and focusing.

With the projector 10 configured as described heretofore, when light is emitted at different timings from the excitation light shining device 70, which shines excitation light on to the luminescent material plate 101 of the luminescent plate device 100, the red light source device 120, and the blue light source device 300, light in the red wavelength range, light in the green wavelength range, and light in the blue wavelength range are incident on the display device 51 by way of the light guiding optical system 140 and the light source-side optical system 170, whereby the DMD, which is the display device 51 of the projector 10, displays red light, green light and blue light in time division, thereby making it possible to project a color image on to the screen.

Figure 3A:
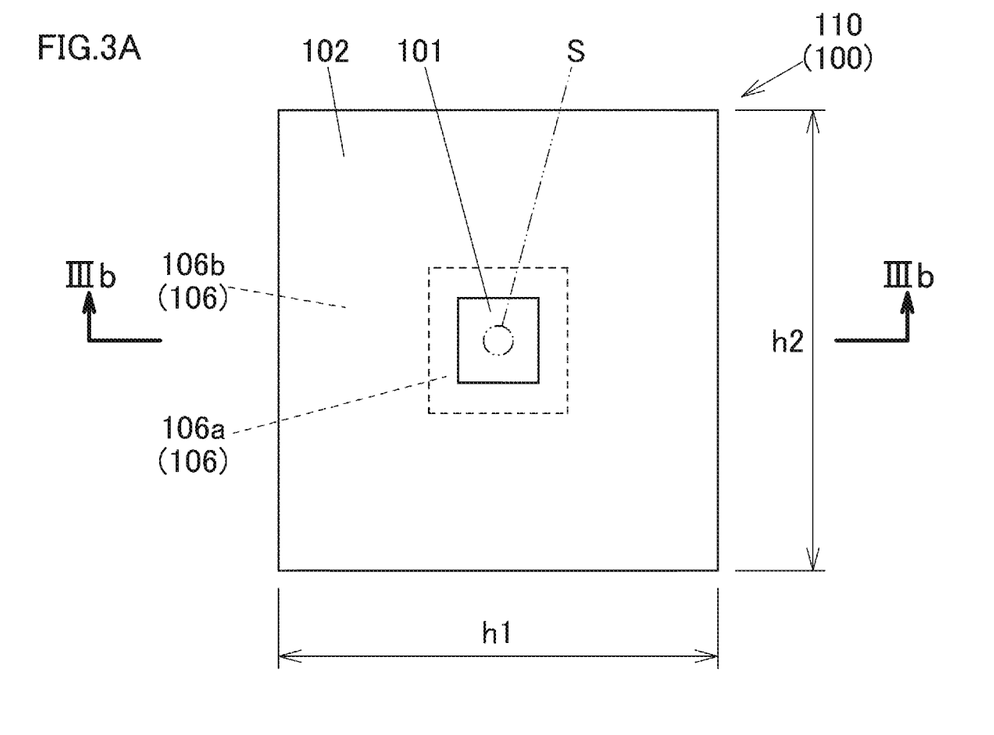
FIG. 3A is a front view of a luminescent material plate according to the embodiment of the present invention, as viewed from an emerging side of the luminescent material plate.
Figure 3B:
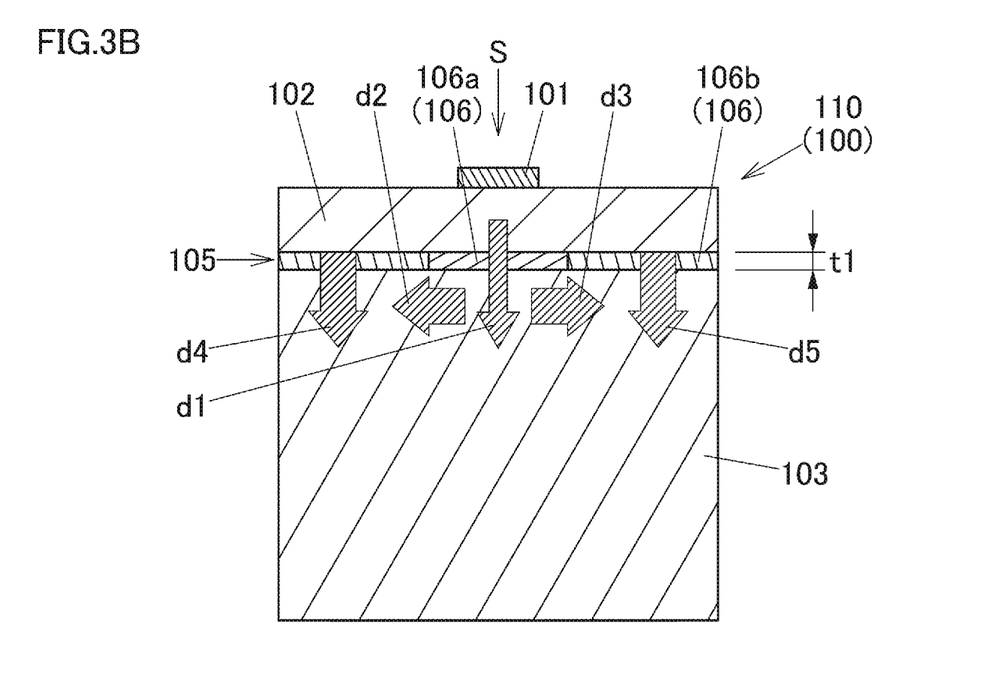
FIG. 3B is a cross-sectional view illustrating a section taken along a line IIIb-IIIb in FIG. 3A.

Next, referring to FIGS. 3A, 3B, the luminescent material plate member 110 of the luminescent plate device 100 will be described. FIG. 3A is a diagram illustrating the luminescent material plate member 110 as viewed from an emerging side, and FIG. 3B is a cross-sectional view illustrating a cross section taken along a line IIIb-IIIb in FIG. 3A and as viewed in the same direction as a direction in which the luminescent material plate member 110 is viewed in the schematic plan view in FIG. 2. The luminescent material plate member 110 includes the luminescent material plate 101, a joining plate 102, and a heat sink 103, which constitutes a heat dissipating member.

The luminescent material plate 101 has a substantially square plate-like shape when viewed from the front thereof as described in FIG. 3A. The luminescent material plate 101 can be formed using a ceramic binder in a green luminescent material. In addition, the luminescent material plate 101 can be formed using an inorganic material such as glass, a transparent resin binder, and the like.

The joining plate 102 has a substantially square plate-like shape when viewed from the front thereof as described in FIG. 3A. The luminescent material plate 101 is fixed to one side of the joining plate 102 in a substantially central position through brazing or the like. The joining plate 102 is made of a metallic base of copper, aluminum, or the like, and the side of the joining pate 102 where the luminescent material plate 101 is provided is mirror finished through silver deposition or the like. Consequently, when excitation light, which is light in the blue wavelength range, from the excitation light shining device 70 is shone on to the luminescent material plate 101, a green luminescent material in the luminescent material plate 101 is excited, whereby light in the green wavelength range is emitted in every direction from the luminescent material plate 101. At this time, luminescent light that is emitted towards an emitting direction, which is a direction in which the excitation light shining device 70 is disposed is emitted as it is as emerging light, and luminescent light emitted in an opposite direction to the emitting direction is reflected on a surface of the mirror-finished side of the joining plate 102 and is then emitted in the emitting direction.

The heat sink 103 is formed into a rectangular flat surface on one side thereof which faces a light emerging side of the luminescent material plate member 110. In the front view of FIG. 3A, the one side of the heat sink 103 and the one side and the other side of the joining plate 102 have the same shape. Multiple fins, not shown, are formed on the other side of the heat sink 103. A heat dissipating member can also be made up of another device (a heat pipe or the like) having a heat dissipating function, in addition to the heat sink 103.

A heat conductive area 105 is formed between the other side of the joining plate 102 and the one side of the heat sink 103. Heat generated from the luminescent material plate 101 when excitation light is shone on thereto is conducted from the joining plate 102 to the heat sink 103 by way of the heat conductive area 105. Specifically, the heat conductive area 105 is specified by a gap t1 defined between sides h1, h2 of the joining plate 102, the other side of the joining plate 102, and the one side of the heat sink 103. Then, in this embodiment, a heat conductive layer 106 is disposed in the heat conductive area 105. The heat conductive layer 106 thermally connects the joining plate 102 and the heat sink 103 together. The heat conductive layer 106 is formed into a thin sheet-like shape and is disposed so as to tightly adhere to the other side of the joining plate 102 and the one side of the heat sink 103.

In the heat conductive layer 106, an area of the heat conductive area 105 which corresponds to the luminescent material plate 105 is formed of a carbon sheet 106a, and an area of the heat conductive area 105 which corresponds to a periphery of the area corresponding to the luminescent material plate 101 is formed of a thermal sheet 106b. In this embodiment, the carbon sheet 106a of the area of the heat conductive area 105 which corresponds to the luminescent material plate 106 is formed larger than the luminescent material plate 101 to some extent. Here, a heat conductivity of the carbon sheet 106a in a direction from the joining plate 102 to the heat sink 103 is lower than that of the thermal sheet 106b. In this way, the heat conductive layer 106 is formed by combining the materials having the different heat conductivities. Consequently, the heat conductivity of the area of the heat conductive area 105 which corresponds to the luminescent material plate 101 becomes lower than the heat conductivity of the periphery of the area of the heat conductive area 105 which corresponds to the luminescent material plate 101.

Here, the carbon sheet 106a has a nature in which a heat conductivity in a horizontal direction (a direction intersecting the emitting direction at right angles, that is, an in-layer direction that is parallel to the one side and the other side of the joining plate 102) is higher than a heat conductivity in a vertical direction (the emitting direction, that is, a normal direction to the one side and the other side of the joining plate 102). On the other hand, the thermal sheet 106b has a heat conductivity that is uniform in both the horizontal direction and the vertical direction.

In the luminescent material plate member 110 formed in the way described heretofore, when excitation light is shone on to an illuminated spot S on the luminescent material plate 101 where excitation light is to be shone, heat is generated. Heat generated from the luminescent material plate 101 is conducted to the carbon sheet 106a of the heat conductive layer 106 by way of the joining plate 102. Since the carbon sheet 106a has the nature described above, in the heat transmitted to the carbon sheet 106a by way of the joining plate 102, one portion is conducted in a vertical direction as indicated by an arrow d1 to arrive at the heat sink 103, whereas most heat is conducted in a horizontal direction as indicated by arrows d2, d3. The heat conducted in the horizontal direction from the carbon sheet 106a is conducted to the thermal sheet 106b and is then conducted to the heat sink 103 by way of the thermal sheet 106b as indicated by arrows d4, d5.

Figure 4A:
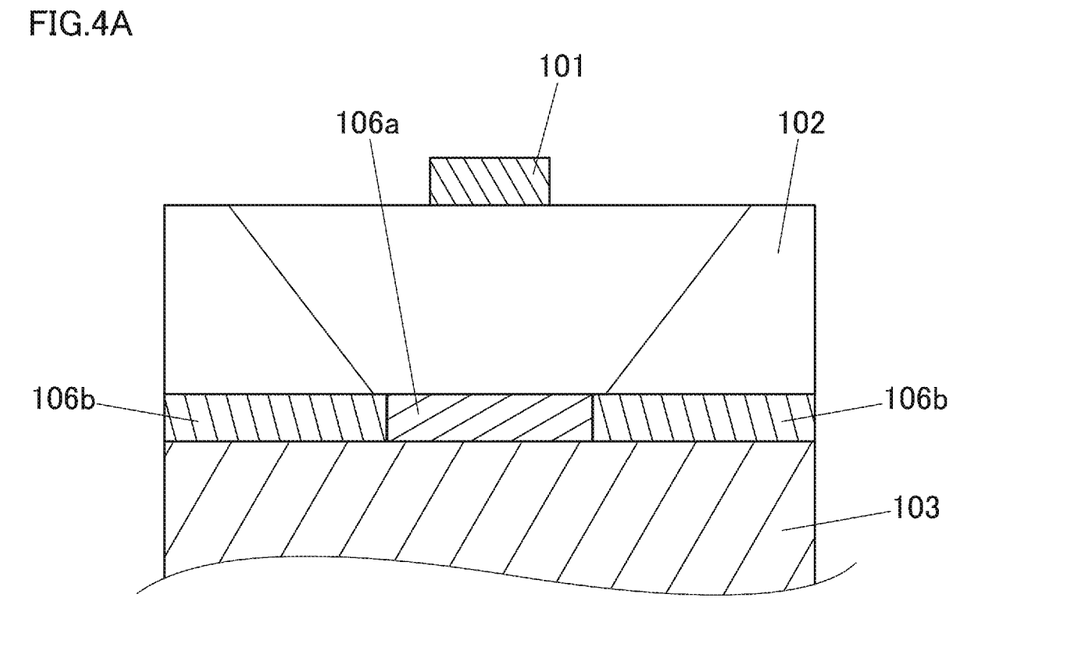
FIG. 4A is a diagram showing a thermal gradient of a joining plate according to the embodiment of the present invention.
Figure 4B:
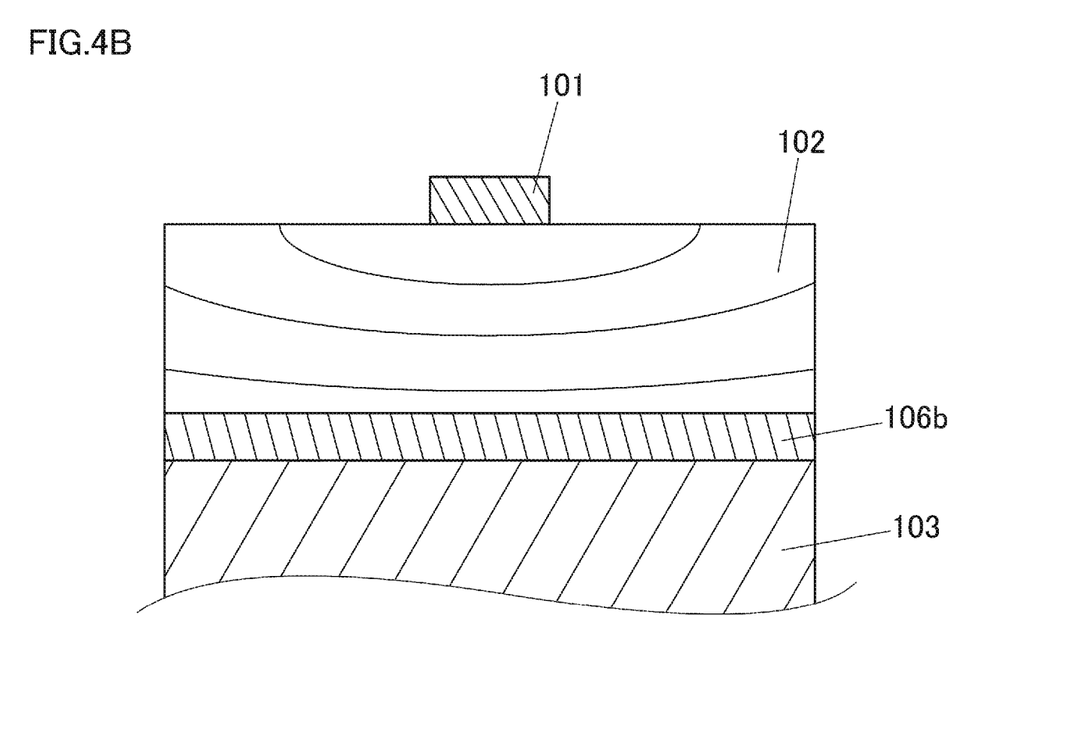
FIG. 4B is a diagram showing a thermal gradient of a joining plate of a conventional luminescent plate device.

FIGS. 4A, 4B illustrate schematic diagrams of thermal gradients (isotherms) in the joining plate 102.

When heat generated in the luminescent material plate 101 is dissipated in the way described above, as illustrated in FIG. 4A, since heat is conducted in the horizontal direction from the luminescent material plate 101, which is a heat generation source, a temperature on the other side of the joining plate 102 becomes close to a temperature on the one side of the joining plate 102, whereby a thermal gradient becomes moderate on the front and rear of the joining plate 102. Consequently, a difference in horizontal elongation due to thermal expansion between the one side and the other side of the joining plate 102 becomes small, whereby the generation of a warp in the joining plate 102 is suppressed.

As in the case of the conventional light source unit, in the event that the heat conductive layer 106 of the luminescent material plate member 110 is all formed o the thermal sheet 106b, as illustrated in FIG. 4B, in the joining plate 102, a concentric thermal gradient centered at the luminescent material plate 101 is generated in the horizontal direction, whereas a laminar thermal gradient is generated in the vertical direction. Then, a difference in elongation due to thermal expansion is generated between the front and rear of the joining plate 102, whereby cracking or separation of the luminescent material plate 101 occurs.

FIRST MODIFIED EXAMPLE

Figure 5A:
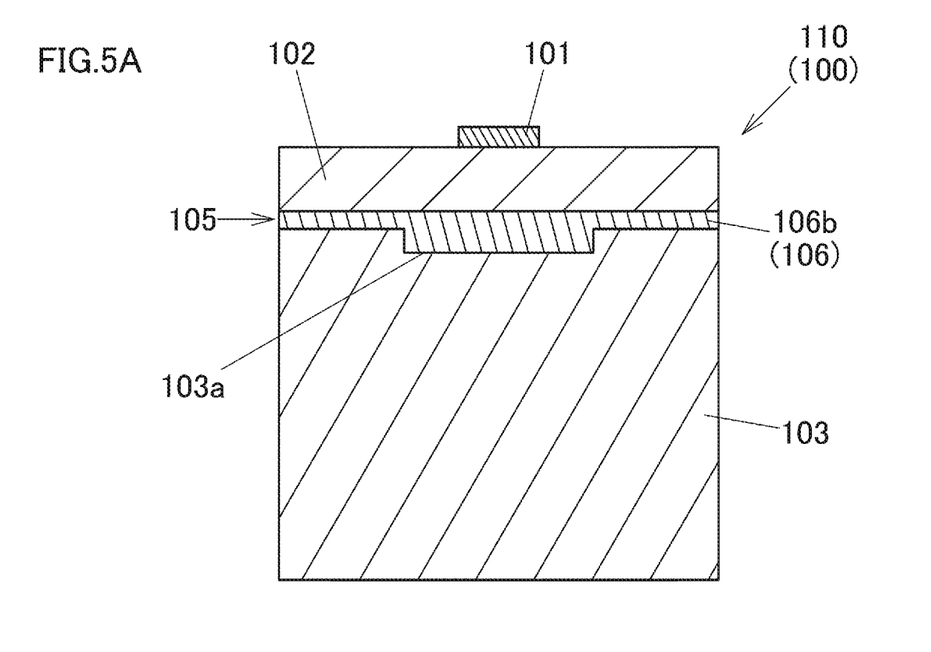
FIG. 5A is a cross-sectional view illustrating a luminescent material plate section according to a modified example, that is, a first modified example, of the embodiment of the present invention, the cross-sectional view corresponding to FIG. 3B.

Next, a modified example of the embodiment of the present invention will be described. As illustrated in FIG. 5A, a rectangular recessed portion 103a is formed on one side of the heat sink 103 in an area of the heat conductive area 15 which corresponds to the luminescent material plate 101, and the heat conductive layer 106 is provided so as to tightly adhere to the other side of the joining plate 102 and the one side of the heat sink 103 including the recessed portion 103a. As this occurs, the heat conductive layer 106 can be formed only of the thermal sheet 106b. Since the thermal sheet 106b of the area of the heat conductive area 105 which corresponds to the luminescent material plate 101 is formed thicker than the thermal sheet 106b of the periphery of the area of the heat conductive area 105 which corresponds to the luminescent material late 101, a heat conductivity of the area of the heat conductive area 105 which corresponds to the luminescent material plate 106 becomes lower than a heat conductivity of the periphery of the area of the heat conductive area 105 which corresponds to the luminescent material plate 101.

SECOND MODIFIED EXAMPLE

Figure 5B:
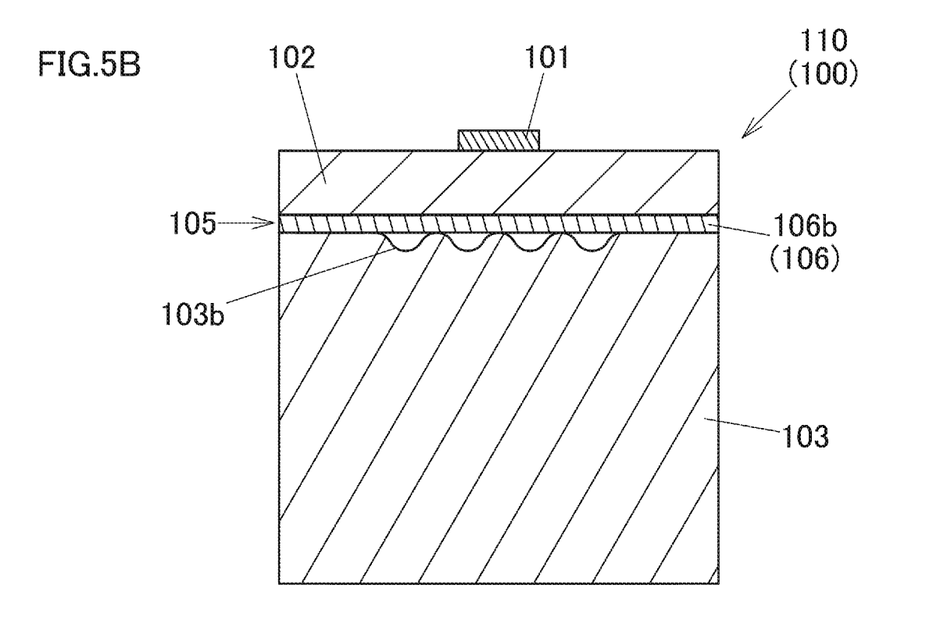
FIG. 5B is a cross-sectional view illustrating a luminescent material plate section according to a modified example, that is, a second modified example, of the embodiment of the present invention, the cross-sectional view corresponding to FIG. 3B.

As illustrated in FIG. 5B, an irregular shape 103b made up of a continuous wavy shape is formed on the one side of the heat sink 103 in the area of the heat conductive area 105 which corresponds to the luminescent material plate 101. Then, the heat conductive layer 106 which is now formed uniformly of the thermal sheet 106b is provided to tightly adhere to the other side of the joining plate 102, whereas the thermal sheet 106b is brought into point contact with the irregular shape 103b on the one side of the heat sink 103, while the thermal sheet 106b is brought into surface contact with a periphery of the irregular shape 103b (the periphery of the area of the heat conductive area 105 which corresponds to the luminescent material plate 101) which is formed flat while tightly adhering thereto. In this modified example, too, a heat conductivity of the area of the heat conductive area 105 which corresponds to the luminescent material plate 101 becomes lower than a heat conductivity of the periphery of the area of the heat conductive area 105 which corresponds to the luminescent material pate 101.

On the contrary to the example illustrated in FIG. 5B, an irregular shape is formed on the one side of the heat sink 103 on the periphery of the area of the heat conductive area 105 which corresponds to the luminescent material plate 101, while the area of the heat conductive area 105 which corresponds to the luminescent material plate 101 is formed into a flat surface. Then, the heat conductive layer 106 is brought into surface contact with both the irregular shape and the flat surface while tightly adhering thereto. This increases an area where the thermal sheet 106b, which is the heat conductive layer 106, is brought into contact with the one side of the heat sink 103 on the irregular shape, and hence, in this case, too, a heat conductivity of the area of the heat conductive area 105 which corresponds to the luminescent material plate 101 becomes lower than a heat conductivity of the periphery of the area of the heat conductive area 105 which corresponds to the luminescent material pate 101.

The heat conductive layer 106 on the heat conductive area 105 may not tightly adhere wholly to the other side of the joining plate 102 and the one side of the heat sink 103, and a space may be formed at part of the heat conductive area 105.

Thus, according to the embodiment of the present invention, the light source unit 60 includes the luminescent material plate 101, the joining plate 102 on the one side of which the luminescent material plate 101 is disposed, and the heat conductive area 105 including the heat conductive layer 106, and the heat conductivity of the area of the heat conductive area 105 which corresponds to the luminescent material plate 101 is lower than the heat conductivity of the periphery of the area of the heat conductive area 105 which corresponds to the luminescent material plate 101.

Due to this, in the area of the heat conductive area 105 which corresponds to the luminescent material plate 101, in the heat generated from the luminescent material plate 101, the conduction of the heat in the vertical direction is interrupted, whereby the thermal gradient becomes moderate on the front and rear of the joining plate 102, and this suppresses the difference in elongation due to thermal expansion between the front side and the rear side of the joining plate 102, thereby reducing the risk of a warp being generated in the joining plate 102. Consequently, even though the luminescent material layer 101 is illuminated by excitation light shone on thereto, the risk of cracking or separation of the luminescent material plate 101 is reduced.

In addition, the horizontal heat conductivity of the area of the heat conductive area 105 which corresponds to the luminescent material plate 101 can be made higher than the vertical heat conductivity. This can suppress the difference in elongation due to thermal expansion between the front side and the rear side of the joining plate 102.

The heat conductive layer 106 can be formed by combining materials having different heat conductivities. As a result, since the other side of the joining plate 102 and the one side of the heat sink 103 can be formed flat, the fabrication of the joining plate 102 and the heat sink 103 can be facilitated.

In the heat conductive layer 106, the area of the heat conductive area 105 which corresponds to the luminescent material plate 101 is formed of the carbon sheet 106a, while the periphery of the area of the heat conductive area 105 which corresponds to the luminescent material plate 101 is formed of the thermal sheet 106b. As a result, since the heat conductive layer 106 can be formed into a single sheet-like shape, the assembly of the luminescent material plate member 110 can be improved.

In the heat conductive layer 106, the thickness of the area of the heat conductive area 105 which corresponds to the luminescent material plate 101 is thicker than the thickness of the periphery of the area of the heat conductive area 105 which corresponds to the luminescent material plate 101. In addition, the continuous irregular shape 103b is formed on the one side of the heat sink 103 which constitutes the portion corresponding to the area of the heat conductive area 105 which corresponds to the luminescent material plate 101. As a result, the heat conductive layer 106 can be formed only of a single material as can be formed only of the thermal sheet 106b, and therefore, the fabrication of the heat conductive layer 106 can be facilitated.

The heat sink 103 can be used as the heat dissipating member. As a result, the heat sink 103 including the multiple fins can be formed through extrusion molding, and therefore, the fabrication of the heat sink 103 can be facilitated.

The projector 10 includes the light source unit 60, the display device 51, the projection-side optical system 220, and the projector control unit. As a result, the generation of thermal stress resulting from shining excitation light is reduced, whereby the projector 10 can be provided which includes the light source unit 60 in which cracking or separation of the luminescent material plate 101 is reduced.

While the embodiment of the present invention has been described heretofore, the embodiment including the modified examples is presented as an example, and hence, there is no intention to limit the scope of the present invention by the embodiment. This novel embodiment can be carried out in other various forms, and various omissions, replacements and modifications can be made to the embodiment without departing from the spirit and scope of the invention. Those resulting embodiments and their modifications are included in the spirit and scope of the present invention and are also included in the scope of inventions claimed for patent under claims below and their equivalents.

What is claimed is:

1. A light source unit comprising:
a luminescent material plate;
a joining plate on one side of which the luminescent material plate is disposed;
a heat dissipating member disposed on the other side of the joining plate; and
a heat conductive layer configured to connect thermally the joining plate and the heat dissipating member and disposed between the joining plate and the heat dissipating member,
wherein a heat conductivity of an area of the heat conductive layer which corresponds to the luminescent material plate is lower than a heat conductivity of a periphery of the area of the heat conductive layer which corresponds to the luminescent material plate.

2. The light source unit according to claim 1,
wherein the heat conductivity is a heat conductivity in a normal direction of the heat conductive layer.

3. The light source unit according to claim 1,
wherein a heat conductivity in an in-layer direction of the heat conductive layer in an area of the heat conductive layer which corresponds to the luminescent material plate is higher than a heat conductivity in a normal direction of the heat conductive layer.

4. The light source unit according to claim 2,
wherein a heat conductivity in an in-layer direction of the heat conductive layer in an area of the heat conductive layer which corresponds to the luminescent material plate is higher than a heat conductivity in a normal direction of the heat conductive layer.

5. The light source unit according to claim 1,
wherein the heat conductive layer is formed by combining materials having different heat conductivities.

6. The light source unit according to claim 2,
wherein the heat conductive layer is formed by combining materials having different heat conductivities.

7. The light source unit according to claim 3,
wherein the heat conductive layer is formed by combining materials having different heat conductivities.

8. The light source unit according to claim 4,
wherein the heat conductive layer is formed by combining materials having different heat conductivities.

9. The light source unit according to claim 1,
wherein the area of the heat conductive layer which corresponds to the luminescent material plate is formed of a carbon sheet, and the periphery of the area of the heat conductive layer which corresponds to the luminescent material plate is formed of a thermal sheet.

10. The light source unit according to claim 2,
wherein the area of the heat conductive layer which corresponds to the luminescent material plate is formed of a carbon sheet, and the periphery of the area of the heat conductive layer which corresponds to the luminescent material plate is formed of a thermal sheet.

11. The light source unit according to claim 3,
wherein the area of the heat conductive layer which corresponds to the luminescent material plate is formed of a carbon sheet, and the periphery of the area of the heat conductive layer which corresponds to the luminescent material plate is formed of a thermal sheet.

12. The light source unit according to claim 4,
wherein the area of the heat conductive layer which corresponds to the luminescent material plate is formed of a carbon sheet, and the periphery of the area of the heat conductive layer which corresponds to the luminescent material plate is formed of a thermal sheet.

13. The light source unit according to claim 5,
wherein the area of the heat conductive layer which corresponds to the luminescent material plate is formed of a carbon sheet, and the periphery of the area of the heat conductive layer which corresponds to the luminescent material plate is formed of a thermal sheet.

14. The light source unit according to claim 6,
wherein the area of the heat conductive layer which corresponds to the luminescent material plate is formed of a carbon sheet, and the periphery of the area of the heat conductive layer which corresponds to the luminescent material plate is formed of a thermal sheet.

15. The light source unit according to claim 7,
wherein the area of the heat conductive layer which corresponds to the luminescent material plate is formed of a carbon sheet, and the periphery of the area of the heat conductive layer which corresponds to the luminescent material plate is formed of a thermal sheet.

16. The light source unit according to claim 8,
wherein the area of the heat conductive layer which corresponds to the luminescent material plate is formed of a carbon sheet, and the periphery of the area of the heat conductive layer which corresponds to the luminescent material plate is formed of a thermal sheet.

17. The light source unit according to claim 1,
wherein a thickness of the area of the heat conductive layer which corresponds to the luminescent material plate is thicker than a thickness of the periphery of the area of the heat conductive layer which corresponds to the luminescent material layer.

18. The light source unit according to claim 1,
wherein the heat dissipating member has a continuous irregular shape at a portion thereof which corresponds to the area corresponding to the luminescent material plate.

19. The light source unit according to claim 1,
wherein the heat dissipating member is a heat sink.

20. A projector comprising:
the light source according to claim 1;
a display device on to which light source light is shone from the light source unit to form image light;
a projection-side optical system configured to project the image light emitted from the display device on to a screen; and
a projector control unit configured to control the display device and the light source unit.

* * * * *